United States Patent [19]

Brogna et al.

[11] Patent Number: 4,989,753

[45] Date of Patent: Feb. 5, 1991

[54] CUP DISPENSER FOR AN AUTOMATED DRINKMAKER SYSTEM

[75] Inventors: Salvatore J. Brogna, Southbury; George E. Riehm, New Fairfield, both of Conn.

[73] Assignee: PepsiCo Inc., Purchase, N.Y.

[21] Appl. No.: 353,882

[22] Filed: May 18, 1989

[51] Int. Cl.[5] .......... B65G 59/00

[52] U.S. Cl. .......... 221/121; 221/188; 221/300

[58] Field of Search .......... 221/4, 10, 11, 121, 221/122, 126, 127, 129, 132, 134, 188, 189, 186, 221, 223, 299, 300, 119

[56] References Cited

U.S. PATENT DOCUMENTS

| | | | |
|---|---|---|---|
| 1,157,645 | 10/1915 | Millard | 221/188 |
| 1,582,451 | 4/1926 | Cooley | 221/188 |
| 3,474,932 | 10/1969 | Rogge | 221/188 |
| 3,849,970 | 11/1974 | Kinney . | |
| 3,951,303 | 4/1976 | Hobden et al. . | |
| 4,098,058 | 7/1978 | Carrigan et al. . | |
| 4,351,452 | 9/1982 | Scalera et al. . | |
| 4,480,764 | 11/1984 | Takagi et al. . | |
| 4,531,342 | 7/1985 | Wittenborg . | |
| 4,618,075 | 10/1986 | Bartfield et al. . | |
| 4,632,274 | 12/1986 | Garbe . | |
| 4,742,937 | 5/1988 | Blom | 221/299 |

FOREIGN PATENT DOCUMENTS

| | | | |
|---|---|---|---|
| 1231937 | 1/1967 | Fed. Rep. of Germany | 221/189 |

*Primary Examiner*—H. Grant Skaggs

*Attorney, Agent, or Firm*—Scully, Scott, Murphy & Presser

[57] ABSTRACT

An automatic cup dispensing arrangement for separating the bottommost cup from a stack of cups supported in a cup dispenser. The cup dispenser is pivotally mounted about a substantially horizontal pivot, about which the cup dispenser is cyclically pivoted to allow the cup stack to cyclically swing through a dispensing travel arc during a dispensing cycle. A pair of opposed cup separating members are mounted on opposite sides of the stack of cups in the cup dispenser along the dispensing travel arc. The opposed cup separating members are spaced a distance apart substantially equal to the width of a cup just beneath the cup rim, and each of the pair of opposed cup separating members comprises at least one cup separating wedge positioned opposite to a corresponding cup separating wedge in the oppositely positioned cup separating member. The oppositely positioned cup separating wedges cooperate to separate the bottommost cup from the cup stack as the cup dispenser is pivoted along the dispensing travel arc. A preferred embodiment of the cup dispensing arrangement includes a cup carousel, having a plurality of the cup dispensers positioned circumferentially therearound, with each cup dispenser being pivotally mounted relative to the cup carousel by a pivot thereon. Each cup dispenser with an associated pair of opposed cup separating members is supported on the cup carousel for rotation therewith, such that any one of the cup dispensers can be positioned at the cup drop station. A cup dispensing mechanism is positioned at the cup drop station to activate any one of the cup dispensers positioned thereat.

8 Claims, 12 Drawing Sheets

CUP DISPENSER FOR AN AUTOMATED DRINKMAKER SYSTEM

BACKGROUND OF THE INVENTION

1. Field of the Invention

The present invention relates generally to a cup dispenser for an automated drinkmaker system designed to accept an input order for drinks, as at a fast food restaurant, and to complete and deliver the finished drink order in lidded cups to an output station in a completely automated fashion.

More particularly, the subject invention relates to a cup dispenser for an automated drinkmaker system designed to accept an input order, as from a cash register, and deliver the drink order for different drink sizes and flavors, with or without ice, completely finished in lidded cups, if desired, to an output station. The automated drinkmaker system is designed for labor-free processing of drink orders in environments such as quick service or fast food establishments.

2. Discussion of the Prior Art

Credle U.S. Pat. No. 4,319,441 is of interest to the present invention by disclosing an automated post-mix drink dispensing system in which a cup dispenser dispenses a cup, into which the ingredients of a soft drink and ice are introduced. An automatic lid dispenser delivers a lid to the cup which is applied thereto by a lid applicator, and the lid is then marked for a designated flavor. The cup is processed through a complete cycle by a cup indexer which consists of upper and lower arms with pockets at each end which hold a cup and move it from one station to the next. One disadvantage of the Credle system is that the cups are transported therein by sliding over a surface, which can present contamination problems as drink spills may possibly contaminate and gum and encumber the surface over which the cups slide. The pockets are adjustable for varying cup sizes. The cup indexer rotates 180°, and then stops with one set of pockets at a fill station for introducing the beverage mix and ice into a cup, and the opposite set of pockets at the lid applicator station for lidding of a cup. A cup ejector is provided which consists of upper and lower arms which contact a cup after a lid has been applied thereto and remove it from the pockets of the cup indexer. The cup ejector moves through a 135° arc to eject the cup, and then reverses direction to return to its original position. The Credle post-drink dispensing system is not as fully automated or as comprehensive as the present invention, and can process only two different drinks at a time, as compared with up to seven different drinks pursuant to the subject invention. Moreover the Credle system does not have the capability of interfacing with an ice dispensing system, and is not fully automated so as to interface directly with a cash register to process an order entered therein.

The Credle system does not have the capacity to store large quantities of cups, as offered by the cup carousel of the present invention. The Credle patent discloses a cup dispensing unit having six cams which separate the bottom cup from a stack, which cup in turn falls downward and is guided into position by flanges. The particular cup dispensing unit is commonly operated by a single solenoid with a spring return. Moreover, the cup dispenser is adjustable such that it can accommodate a variety of cup sizes ranging, for example, from 16 oz. to 24 oz.

SUMMARY OF THE INVENTION

Accordingly, it is a primary object of the present invention to provide a cup dispenser for an automated drinkmaker system designed to accept an input order, as from a cash register, and deliver the drink order for different sizes and different flavors, with or without ice, completely finished in lidded containers, if desired, in several possible sizes, to an output station. The automated drinkmaker system is designed for labor-free processing of drink orders in environments such as quick service or fast food establishments.

The automated drinkmaker machine incorporates therein a rotatable carousel type of drink transporter which has a plurality of circularly spaced cup holders thereon. In a disclosed embodiment the drink transporter carries each drink as it is being prepared to and from four circularly spaced stations, cup dispensing, ice dispensing, soda dispensing, and lid application and marking. In some embodiments, the lid application station can be omitted completely, thereby delivering the finished drinks in unlidded containers. The transporter is a carousel design that allows a cup to be dispensed at one station while another cup is being filled with ice at a second station, and yet another is being filled with soda at a third station, etc. The use of carousels is extended to both the cup dispensing station of the present invention and the lid dispensing station. The system is designed to interface with any commercially available, portioning ice dispenser, and also to interface directly with a cash register system to enable a cashier to directly input a customer order. At an output station, the cup is raised from the carousel by a linear transporter (elevator) which carries the cup up and down through a lidding and marking operation, after which the completed drink is transferred to an output conveyor and station.

The rotatable carousel drink transporter carries each cup in a cup holder supporting the cup below its rim. One advantage of this design approach is that there is a greater immunity from contamination of the system by drink spills, from other drinks which have been processed, as drink spills can fall onto a drain area therebelow and not interfere with continued operation of the system.

The automated drinkmaker system can incorporate therein a lesser or greater number of processing stations or cup holders. For instance, drink dispensing could be separated into one or more syrup dispensing stations and a separate carbonated water dispensing station. Moreover the order of dispensing the drink components, including the syrup, the carbonated water and the ice, could be varied in different embodiments.

Pursuant to one designed and disclosed embodiment, the automated drinkmaker machine is designed to deliver completed drinks at a rate of ten drinks per minute, taking fifteen seconds for the first drink and five seconds for each additional drink. Up to twenty drinks can be accumulated on the machine's output conveyor at a completed drink storage area, which can, for example, be grouped as five orders with four drinks per order, although in alternative embodiments the output conveyor could be expanded or contracted to hold a greater or lesser number of finished drinks. Pursuant to the present invention, a cup dispenser is designed to provide the automated drinkmaker with three cup sizes, normal 16 ounce and 22 ounce sizes, and also possibly a 32 ounce promotional plastic cup, with a cup storage of seven hundred cups. Although, a different number of different size cups could be implemented in alternative embodiments. The 16 and 22 ounce cups have the same upper cup diameter, and the drink transporter has alternately sized cup holders thereon, one size for the 16 and 22 ounce cups and a second size for the 32 ounce promotional cups. Lids can be applied to the 16 and 22 ounce cups from a lid storage of 650 lids. The lids can be marked to identify drinks by three categories diet, tea or other.

In accordance with the teachings herein, the present invention provides a cup dispensing arrangement for separating the bottommost cup from a stack of cups supported in a cup dispenser. The cup dispenser is pivotally mounted about a substantially horizontal pivot, about which the cup dispenser is cyclically actuated to allow the cup stack to cyclically swing through a cup dispensing travel arc during dispensing. A pair of opposed cup separating members are mounted on opposite sides of the stack of cups in the cup dispenser along the dispensing travel arc. The opposed cup separating members are spaced a distance apart substantially equal to the width of a cup just beneath the cup rim, and each of the pair opposed cup separating members comprises at least one cup separating wedge positioned opposite to a corresponding cup separating wedge in the oppositely positioned cup separating member. The oppositely positioned cup separating wedges cooperate to separate a bottommost cup from the cup stack as the cup dispenser is pivoted along the dispensing travel arc. Each of the pair of opposed cup separating members preferably comprise upper and lower cup separating wedges positioned in both forward and rearward positions which are vertically offset relative to each other. The opposed cup separating members act in a two cycle manner to separate the bottommost cup from a stack of cups during two complete pivot cycles of the cup dispenser.

A preferred embodiment of the cup dispensing arrangement includes a cup carousel having a plurality of cup dispensers positioned circumferentially therearound, with each cup dispenser being pivotally mounted relative to the cup carousel by a pivot on the cup carousel. Each cup dispenser is spring biased outwardly on the cup carousel to a neutral stopped position. The cup carousel is preferably driven in rotation by a pulse stepper motor which is driven by pulses issued by a controller which controls operation of the rotatable cup carousel. Each cup dispenser with a pair of opposed cup separating members is supported on the cup carousel for rotation therewith, such that any one of the cup dispensers can be positioned at the cup drop station. Additionally, a cup dispensing mechanism is positioned at the cup drop station to activate any one of the cup dispensers positioned thereat. The cup dispensing mechanism is driven by a pulse stepper motor, driven by pulses issued by a controller which controls operation of the cup dispensing mechanism. The cup dispenser comprises a slider crank mechanism which is rotated by the pulse stepper motor through a dispensing cycle during one revolution thereof, and includes a slider bar positioned to activate a contact arm on each cup dispenser. Moreover, an inductive sensor is positioned adjacent to one end of the slider bar to sense the return of the slider bar after the slider crank mechanism is driven through a complete dispensing cycle.

The cup dispenser arrangement dispenses cups from any one of six stacks circumferentially spaced around a cup carousel, with only two actuators. A first actuator, a stepping motor, is a part of the cup carousel drive which rotates the proper cup stack into a cup dispensing position above a cup dispensing station. The second actuator, a stepping motor, is used to dispense the cup. A unique design feature of the cup dispenser of the present invention is that it moves a stack of cups through a small swinging arc motion to dispense a cup, which is distinctly different from other prior art dispensers in that the cup stack moves through opposed separating members, rather than the separating member(s) moving between adjacent cups. This design strategy allows the use of a simple pivot, and allows a single actuator to provide all the dispensing motion. The nature of the design enables a minimization of the dispensing package size and results in a more reliable system having fewer moving parts.

Each cup stack is pivotally mounted about a simple horizontal pin pivot relative to the cup carousel, such that each stack is rotatable to swing through an arc about its pivot, towards and away from the central axis of the cup carousel. Each stack is also spring biased outwardly to a neutral stopped position by a spring, which can be a simple flexed spring extending in compression between opposed stacks to its stopped normal outward position, in which the cup carousel can be rotated.

The cup dispenser arrangement includes three main elements, the cup carousel, a cup carousel drive, and a cup dispensing actuator. The cup dispenser arrangement is designed to store and dispense a sufficient quantity of cups in several sizes to take a high volume restaurant through a peak demand period without requiring a refill.

The cup carousel drive serves two functions, first it positions a proper size cup tower over a cup holder at the cup drop area of station on the carousel drink transporter, and secondly serves as the structural support for the cup carousel. The cup carousel drive assembly includes a stepping motor, a drivetrain, an encoder disc plate and sensor, an output shaft, and a support frame. A unique feature of this assembly is that it uses a simple, low cost mechanism and encoder to position the cup tower. This design enables the system to find the correct cup tower regardless of the number of times power is turned off and on. In this arrangement, the cup carousel is rotated, under command of the controller, by the stepping motor carousel drive. The drive arrangement can be a relatively simple arrangement in which a stepping motor drives a belt attached to a pulley which rotates the cup carousel, and the position of the cup carousel is sensed by a stationary encoder detector mounted relative to the encoder plate which rotates with the cup carousel.

Once the proper cup stack holding the proper cup size for the drink order being processed is rotated into the dispensing position at the cup drop station, the cup dispensing actuator is actuated through a cup dispensing cycle. The cup dispensing actuator is preferably a stepping motor driving a crank arm, which is pivotally attached to an actuator arm, which is mounted at its second end to a slider bar for linear sliding movement towards and away from the central axis of the cup carousel. The second end of the actuator arm includes a contact hook extension which is positioned behind a contact arm attached to the cup stack. In this arrangement, when the stepping motor drives the crank arm through one full revolution, the contact extension is driven through one cycle, first away from and then towards the central axis of the cup carousel. This causes the cup stack to be driven through a pair of opposed cup separating members. The slider bar has an inductive sensor mounted at one end, and the cup dispenser pulse stepping motor is pulsed until the inductive sensor detects one complete cycle, indicated by the slider bar being removed from the inductive sensor, or the system times out, indicating a stall. The design intent is to drive the system through minor stalls and cup jams. Since the overall subassembly design requires that only one cup stack be moved at a time, the stepping motor size can be held to a minimum.

The cup separating members have a unique design and utilize a multiple stage separating metod for separating the bottommost cup in a stack from the cup immediately thereabove. Each cup separating member includes cup separating fingers, and a second set of mirror image cup separating fingers is positioned on the opposite cup separating member at the bottom of each cup stack, positioned apart by the exterior width of a cup just below the cup rim. The cup separating fingers are maintained relatively stationary as a cup stack is rotated through the swinging motion. In the first two stages of cup separation, the cups are drawn back and forth across the relatively stationary fingers. The curved surfaces of the cup separating fingers push the cups apart, until there is sufficient space between the two lowermost cups to enable the bottommost cup to drop onto the cup supporting fingers below. The third separation stage allows the cup to fall when it is properly positioned over a cup holder on the drink transporter.

In summary, cup separation is a two stage procedure that requires two full cycles, one for each actuation of the cup dispensing actuator, to cause a cup to travel through the finger network. In the first stage, the fingers force partial separation of the cups. During the second stage, the cups are further separated and end up in the final staging area, ready to drop. Once the system has been primed, the bottom cup is dispensed very quickly during the first half stroke of the slider crank mechanism. So that while one cup is being dispensed, the next cup immediately above it is being separated from the stack.

The two stages of separation advantageously allow for separation of two cups with less force being applied to the cup rim, thereby reducing the likelihood of damaging the cup rim and causing a jam. Also, the two stage procedure permits separation in a small travel distance, allowing for a compact design of the cup separating mechanism.

BRIEF DESCRIPTION OF THE DRAWINGS

The foregoing objects and advantages of the present invention for a cup dispenser for an automated drinkmaker system may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
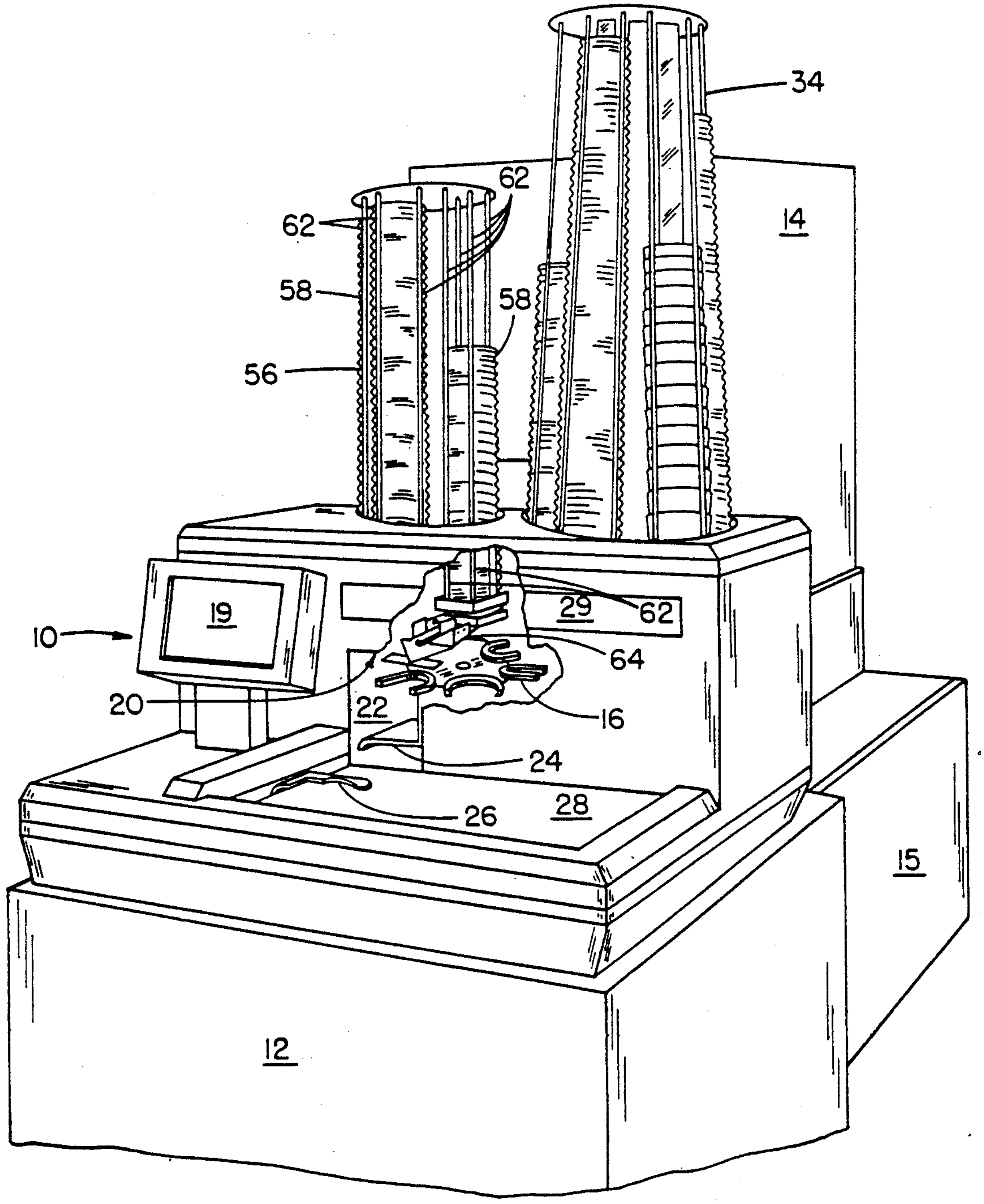
FIG. 1 is a front perspective view, partially broken away, of an exemplary embodiment of an automated drinkmaker machine.
Figure 3:
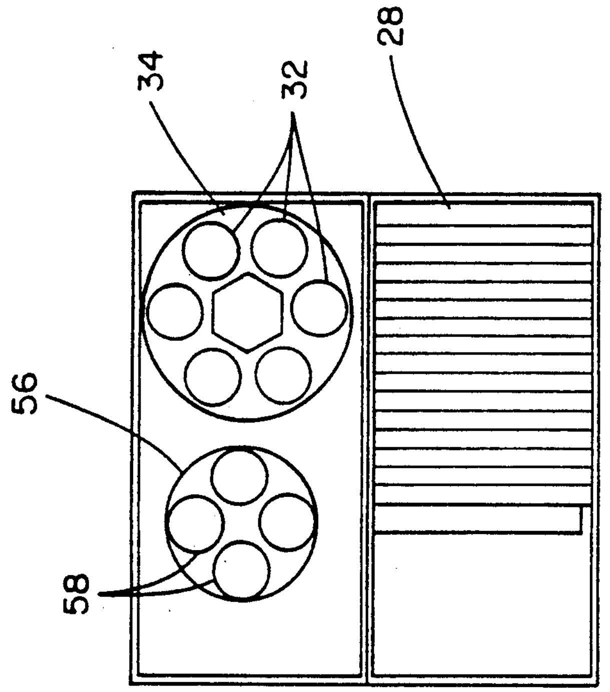
FIG. 3 is a top plan schematic view of the automated drinkmaker machine, illustrating the relative positions of a cup carousel, a lid carousel, and an output conveyor and finished drink storage area.
Figure 2:
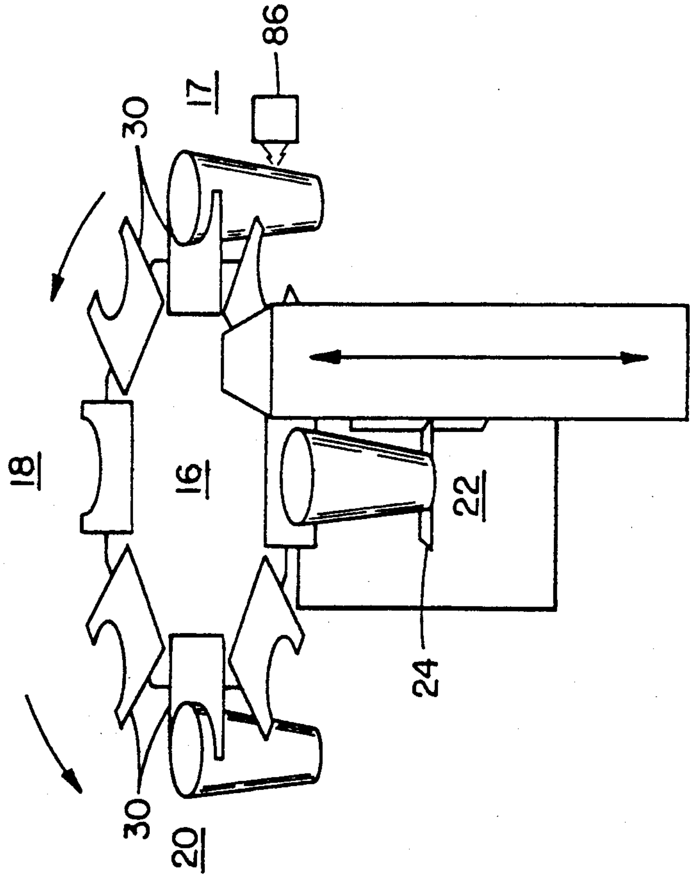
FIG. 2 is a schematic illustration of the drink transporter carousel, shown carrying three cups, and the elevator assembly which carries a cup through lid application and marking operations.

Referring to the drawings in detail and in particular to FIGS. 1–3, a disclosed automated drinkmaker 10 is illustrated positioned on top of a counter 12 and in front of a commercially available portioning ice dispenser 14, and includes a controller cabinet 15 for housing the controller for the automated drinkmaker system. The automated drinkmaker is described and claimed in detail in U.S. patent application Ser. No. 07/353,880, filed May 18, 1989, and is designed around a carousel type of drink or cup transporter 16, FIGS. 1 and 2, which is designed to allow for parallel processing of up to seven drinks.

Figure 5:
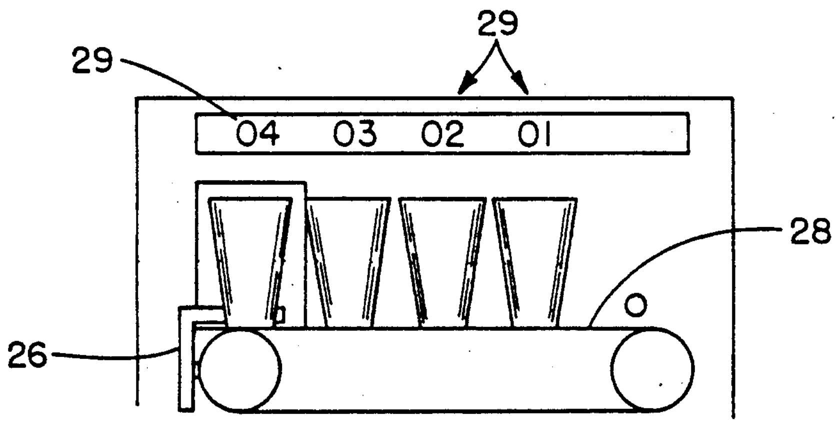
FIG. 5 illustrates a front elevational view of the output conveyor of FIG. 4, and also shows the customer numbered order displays.

The drink transporter 16 moves a cup in a circular path intermittently through four drink preparation stations. The carousel drink transporter 16 carries each cup intermittently in a circular path to each of four processing stations, cup dispensing 17, ice dispensing 18, soda dispensing 20, and finally to an output station 22. At the output station 22, the cup is transferred to a linear elevator transporter 24 which carries the cup up and down through a lidding and marking procedure and brings it to rest at a proper height so that the completed drink can be transferred by a pusher or sweeper arm 26 to an output conveyor 28. Order displays 29, FIGS. 1 and 5, are provided adjacent to the output conveyor 28 to display a drink order number in association with each completed drink order. The order number is indexed to the right with movement of the output conveyor 28 as additional finished drink orders are deposited onto the output conveyor 28.

The automated drinkmaker 10 also includes a cup carousel 34 for supplying at least two, and possibly three, different size cups to a cup separator and dispenser which dispenses the proper size cup onto a cup holder of the drink transporter 16. Moreover, a lid carousel 56 holds at least four stacks of lids which are supplied to the lid dispenser and applicator of the present invention, which separates lids from a lid stack and applies them on top of a finished drink cup. A display 19 is also provided to display various messages and data to operating personnel, such as to resupply lids or cups, or to check a particular area for a problem such as a jam, or to display entered orders. Entry buttons are also available in association with the display to enter orders, or indicate that specific actions, such as lids resupplied, have been taken.

Figure 6:
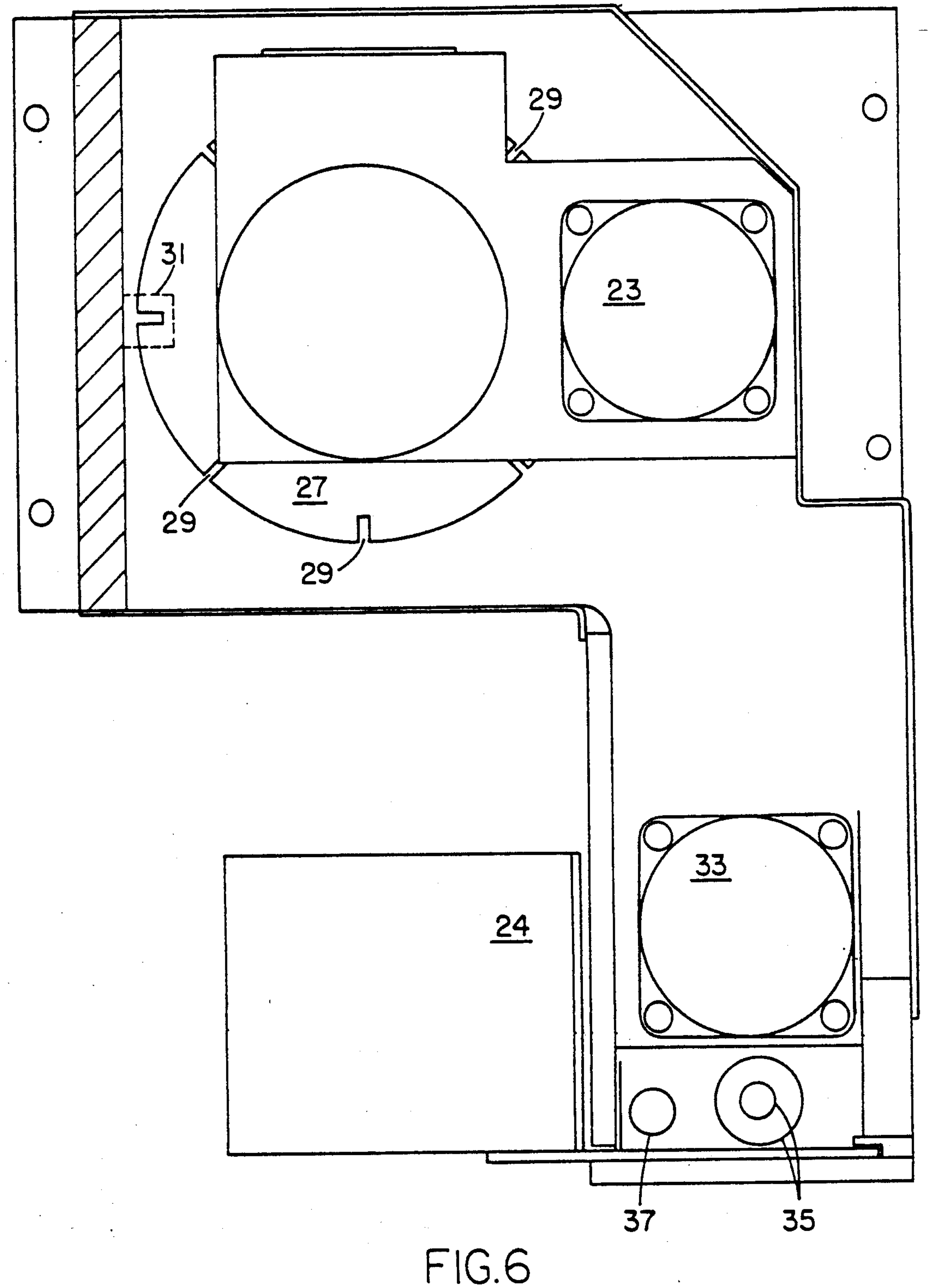
FIG. 6 is a top planar partially sectional view of the drink transporter carousel drive mechanism and positional sensor mechanism, and also illustrates the elevator platform and its support and drive mechanisms.
Figure 7:
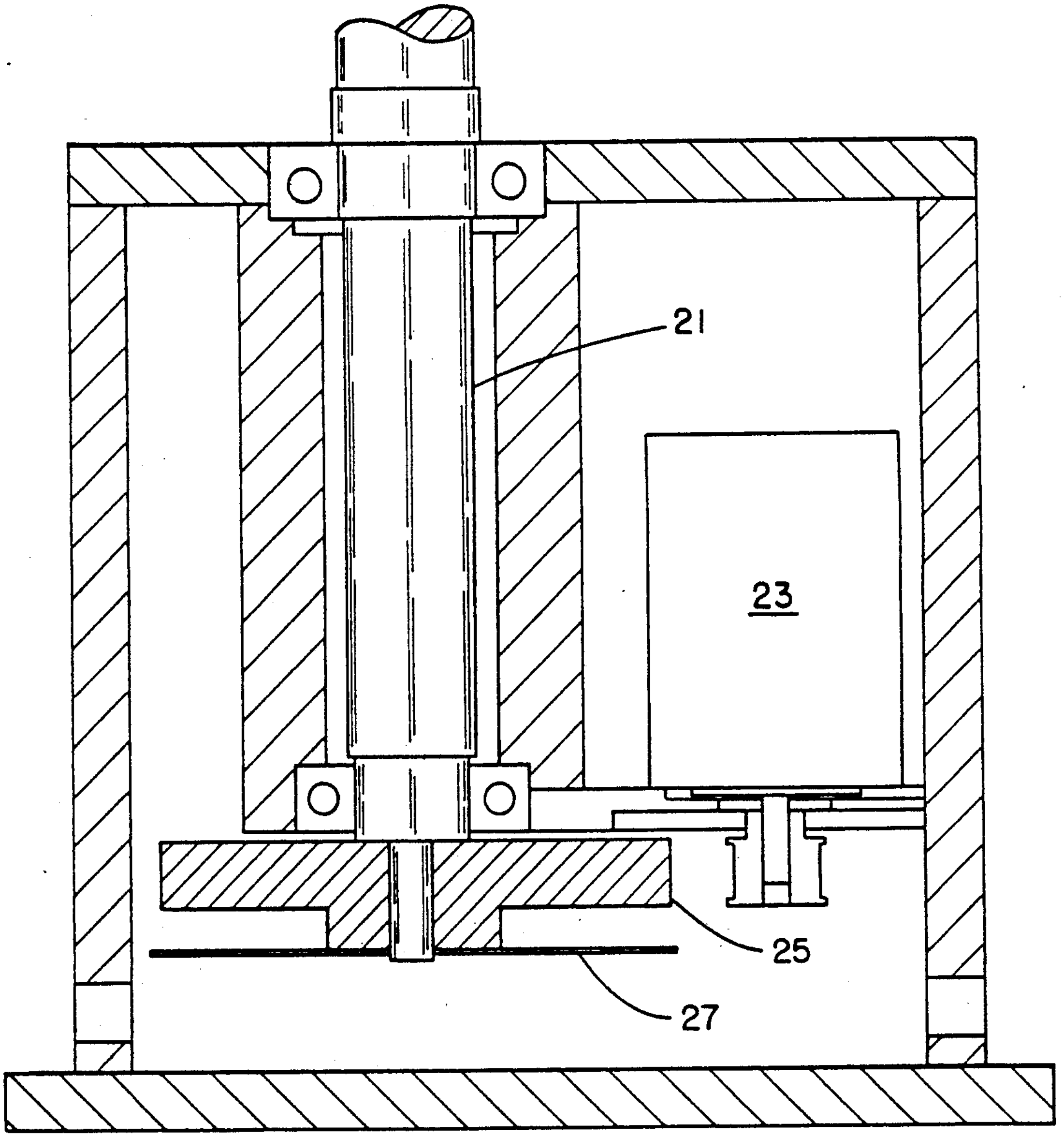
FIG. 7 is a partially sectional elevational view of the carousel drive mechanism and the positional sensor mechanism.

FIGS. 6 and 7 illustrate details of the carousel drink transporter 16 drive system and also the elevator platform 24 drive system. Referring thereto, the drink transporter carousel 16 is mounted on a vertical output shaft 21. A stepping motor 23 drives a pulley 25 secured to the bottom of the vertical output shaft by a belt drive extending therebetween. An encoder plate 27 is secured to the vertical output shaft 21 for rotation therewith, and includes eight different size (either large or small) light transmitting notches 29 therearound which are sensed by an encoder detector 31 placed adjacent to the encoder plate 27. The cup transporter is driven by the stepping motor 23 which is issued a number (e.g. 800) of pulses necessary to accomplish a required cup transporter, e.g. 90° rotation, and the rotation is detected by the encoder detector 31. The encoder plate sensor signal is checked by the system controller to determine that the on-off signals are being received at the proper time (the machine is in synchronization). If a transporter sync error is detected, an error message "CHECK TRANSPORTER" is displayed. Responsive thereto, the operator is to check the drink transporter, and signals the processor by pressing a button that the transporter is clear with no jammed cups. Once that signal is received, the machine pulses the transporter stepping motor until one of the small or larger slots, positioned 45° apart around the encoder disk, passes by the encoder sensor. The number of pulses required to step the disk through the slot indicates to the machine processor if it is a small or large slot. The system knows the quadrant it was operating in prior to the stall, and thus can ascertain its position completely, and can resume operation.

FIG. 6 illustrates the platform elevator 24 which is driven for vertical elevational movement by a stepper motor 33 driving a screw drive 35 and also supported for movement by a vertically extending slider element coupling 37. The platform elevator serves the fourth work station, which is the lidder and marker station, at which the elevator 24 lifts a drink from the transporter and positions it at the proper height for lidding. The position of the elevator 24 is first initialized when the machine is turned on, and the position is then maintained and tracked in memory. The elevator is a screw drive 35, driven by the stepper motor 33, and additionally includes a linear encoder plate with a notch detected by an associated encoder type of sensor when the elevator is at the output conveyor 28 position. Accordingly, when pulse commands are given to drive the elevator, the system processor also calculates the time when the encoder sensor should detect a transition, and looks for the transition at that time. If the transition is not detected at the calculated time, the machine is out of synchronization, and the operator is notified to check the elevator for problems, and indicates by pushing a button after the elevator is checked and is free to operate. The machine then resynchronizes itself by looking for the encoder plate notch, and then resumes normal operation.

The position of the elevator is always checked first by the system processor prior to issuing a drive command to the drink transporter to determine that the elevator is in a noninterfering down position. The size of cup delivered by the drink transporter to the elevator is known. The lid applicator is a known given distance above the drink transporter, and accordingly the processor determines the vertical drive necessary for the cup size being lidded to raise the cup to the lid applicator to a standard lid applicator position for all cup sizes. The lid applicator is already positioned at its outermost position with a lid in position to be applied to a cup when the elevator raises the cup rim to the standard lid applicator position.

The motions for both the elevator 24 and the drink transporter 16 are programmable, so that cups of varying proportions can be accommodated. The drink transporter 16 can move either 90° or 45° depending upon the cup size it is carrying. The elevator 24 has a seven inch stroke, and is programmed to stop at any point in its travel to accommodate different cup sizes.

Two different size cup holders 30, FIG. 2, are incorporated into the drink transporter, and both operate in the same manner. One cup holder is sized for carrying medium (16 ounce) and large (22 ounce) cups, both of which have the same upper rim diameter, and the second is sized for promotional (32 ounce) cups. An important design feature is that the cup holders 30 are passive devices, as illustrated in FIGS. 1 and 2, that hold the cup throughout the drink preparation cycle and allow removal of the cup by the elevator 24 at the output station 22. The design of the cup holder relies upon the tapered shape of a cup. The opening of the cup holder is sized such that the cup can slide out of the cup holder when the cup is raised by the elevator 24, but is securely held therein when the cup is carried just below its rim.

Figure 8:
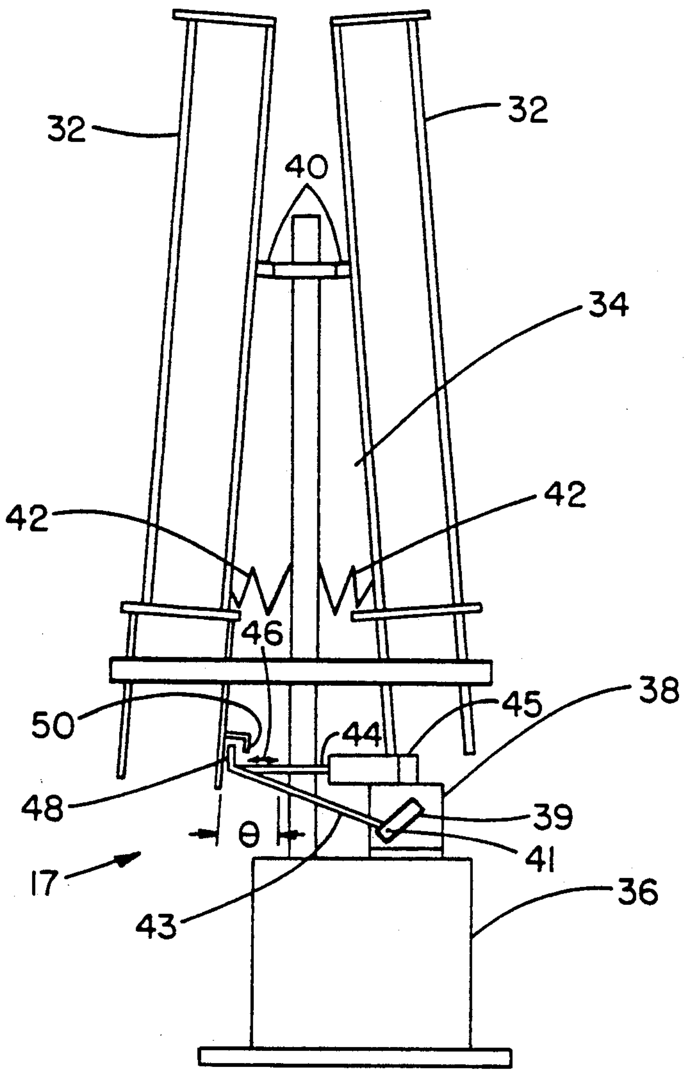
FIG. 8 is a side elevational view of the cup carousel and cup dispensing subassembly.

The cup dispenser subassembly 17, FIG. 8, can dispense cups from any one of six stacks 32 held in a cup carousel 34, with only two actuators. A first actuator, a stepping motor, is a part of a cup carousel drive 36 which is used to rotate the proper stack into a cup dispensing position above the cup dispensing station 17 and the second actuator 36, a stepping motor, is used to dispense the cup. A unique design feature of the cup dispenser is that it moves a stack of cups through a small swinging motion (3.6°) to dispense a cup, which is distinctly different from other prior art dispensers in that the cup stack moves through opposed separating members rather than the separating member(s) moving between adjacent cups. This design strategy allows the use of a simple pivot and allows a single actuator to provide all the dispensing motion. The nature of the design enables a minimization of the package size and results in a more reliable system having fewer moving parts.

Each cup stack 32 is pivotally mounted about a simple pin pivot 40 on the cup carousel 34, such that each stack 32 is rotatable to swing through an arc about pivot 40, towards and away from the central axis of the cup carousel. Each stack 32 is also spring biased outwardly by a spring 42, which can be a simple flexed spring extending in compression between opposed stacks 32 to a stopped normal outward position, as shown in FIG. 8. The cup carousel can be rotated with the cup stacks positioned in their normal outward positions.

The cup dispenser subassembly is formed of three main elements, a cup carousel drive 36, a cup dispensing actuator 38, and a cup carousel 34. The cup dispenser subassembly is designed to store and dispense a sufficient quantity of cups to take a high volume restaurant through a peak demand period without requiring a refill. As currently designed in the illustrated embodiment, the cup carousel can store 700 cups (450 medium 16 ounce, 200 large 22 ounce, and 50 jumbo 32 ounce).

The cup carousel drive 36 of the cup dispensing subsystem serves two functions, first it positions a proper size cup tower over a cup holder at the cup dispensing station 17 on the carousel drink transporter, and secondly it serves as the structural support for the cup carousel 34. The cup carousel assembly includes a stepping motor, a drivetrain, an encoder disc and sensor, an output shaft, and a support frame. A unique feature of this assembly is that it uses a simple, low cost mechanism and encoder to position the cup tower. This design enables the system to find the correct cup tower regardless of the number of times power is turned off and on. In this arrangement the cup carousel 34 is rotated, under command of the controller, by the stepping motor carousel drive 36. The drive arrangement 36 can be a relatively simple arrangement in which a stepping motor drives a belt attached to a pulley which rotates the cup carousel, and the position of the cup carousel is sensed by a stationary encoder detector mounted relative to an encoder plate which rotates with the cup carousel, similar to that described hereinabove with respect to the drink transporter carousel.

Figure 18:
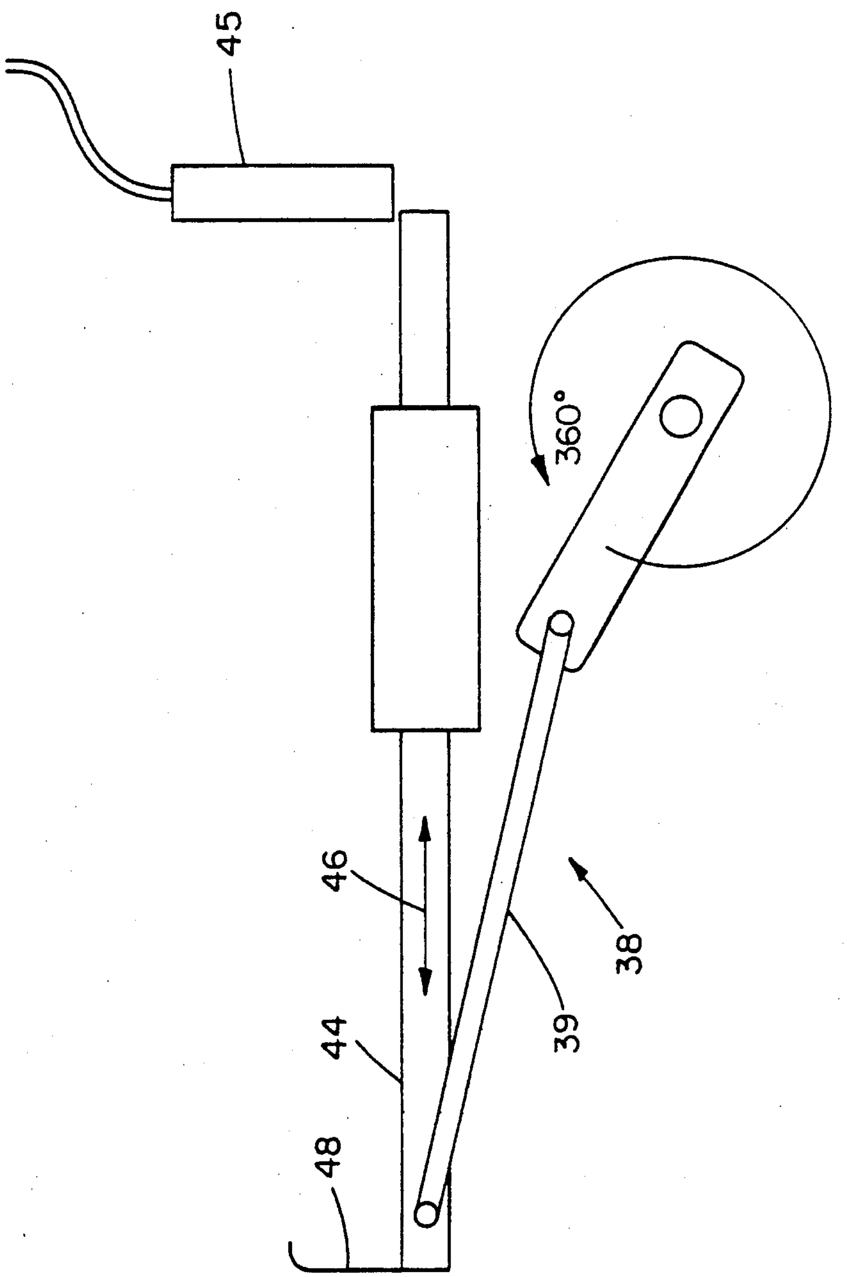
FIG. 18 illustrates a side schematic view of the cup dispenser actuator of the present invention.

Once the proper cup stack 32 holding the proper cup size for the drink order being processed is rotated into the dispensing position, illustrated at the left stack of FIG. 8, the cup dispensing actuator 38 is actuated through a cup dispensing cycle. The cup dispensing actuator 38, as illustrated in FIGS. 8 and 18, is basically a stepping motor driving a crank arm 39, which is pivotally attached at 41 to an actuator arm 43 which is mounted at its second end to a slider bar 44 for linear sliding movement 46 towards and away from the central axis of the cup carousel. The second end of the actuator arm 43 includes a contact hook extension 48 which is positioned behind a contact arm 50 attached to the cup stack 32. With this arrangement, when the stepping motor drives crank arm 39 through one full revolution, contact extension 48 is driven, as at 46, through one cycle first away from and then towards the central axis of the cup carousel. This causes the cup stack to be driven through a pair of opposed cup separating fingers 52, 54, FIG. 10, as described in greater detail hereinbelow. The slider bar 44 has an inductive sensor 45 mounted adjacent to its end, and the cup dispenser motor is pulsed until the inductive sensor 45 detects one complete cycle, indicated by the slider bar being removed from the inductive sensor, or the system times out, indicating a stall. An advantage of this design is that the system can be driven through minor stalls and cup jams. The overall subassembly design requires that only one cup stack be moved at a time, while utilizing a single stepping motor for all of the cup stacks.

The cup carousel assembly consists of six cup towers 32, the support structure for pivotting those towers, 40, FIG. 8, the cup separating members (fingers) 52, 54, and the cup tower return springs 42.

Figure 10:
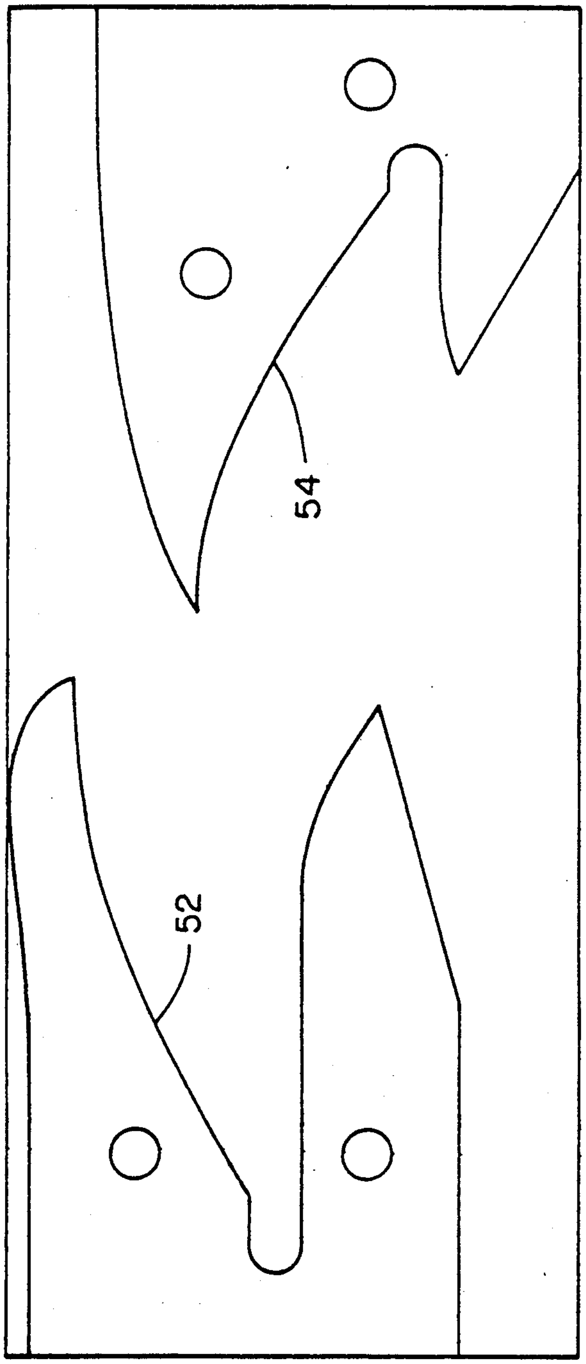
FIG. 10 is a side elevational view of one pair of separating fingers, through which a cup is successively moved as it is separated from a cup stack.

The cup separating fingers 52, 54, illustrated in FIGS. 10 through 14, have a unique design and utilize a multiple stage separating method for separating the bottommost cup in a stack from the cup immediately above it. One set of cup separating fingers 52, 54 is illustrated in FIG. 10, and a second set of mirror image cup separating fingers is positioned at the bottom of each cup stack, positioned apart by the exterior width of a cup just below the cup rim. The cup separating fingers 52, 54 are maintained stationary relative to the cup stack as the cup stack 32 is rotated through the swinging motion $\theta$. In the first two stages of cup separation illustrated in FIGS. 11, 12 and 13, the cups are drawn back and forth across the relatively stationary fingers. The curved surfaces of the cup separating fingers push the cups apart, until there is sufficient space between the two lowermost cups to enable the bottommost cup to drop onto the cup supporting fingers below, FIG. 13. The third stage, FIG. 14, allows the cup to fall when it is properly positioned over a cup holder on the drink transporter.

Cup separation is a two stage procedure that requires two full cycles, one for each actuation of the cup dispensing actuator, to cause a cup to travel through the finger network. In the first stage, the fingers force partial separation of the cups. During the second stage the cups are further separated and end up in the final staging area, ready to drop. Once the system has been primed, FIG. 13, the bottom cup is dispensed very quickly during the first half stroke of the slider crank mechanism. So, while one cup is being dispensed, the next cup immediately above it is being separated from the stack.

The two stages of separation advantageously allow for separation of two cups with less force being applied to the cup rim, thereby reducing the likelihood of damaging the cup rim and causing a jam. Also, the two stage procedure permits separation in a small travel distance, allowing for a compact design of the cup separating mechanism.

Figure 11:
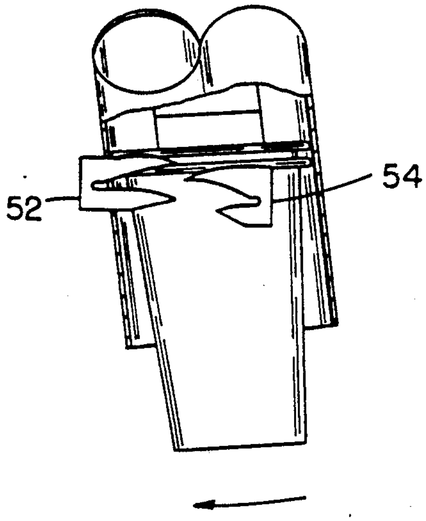
FIGS. 11 through 14 illustrate respectively four successive steps of separating and dispensing a cup from a stack of cups through a set of oppositely disposed separation fingers.
Figure 12:
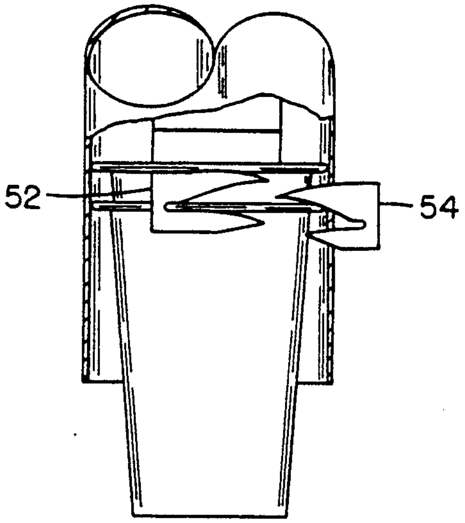
Figure 13:
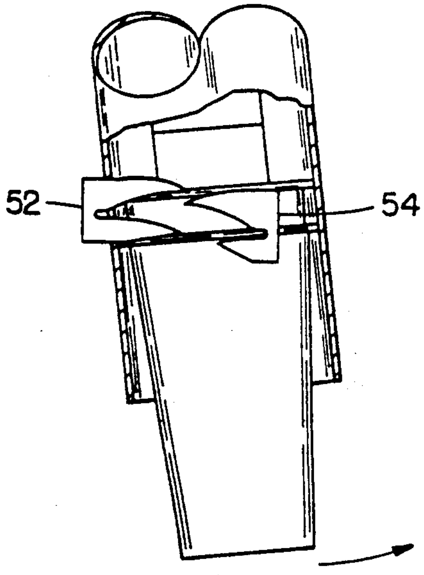
Figure 14:
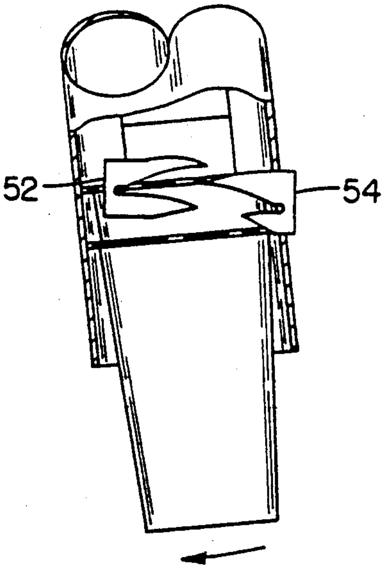

As illustrated in FIG. 11, in the first stage of separation the bottommost cup is initially supported by the upper surfaces of the opposed upper right fingers of 54. As the cup stack swings to the left proceeding from the position of FIG. 11 to that of FIG. 12, the bottom surfaces of the opposed upper left fingers 52 cause a separation of the lowermost cup such that it falls onto and is now supported by the upper surfaces of the opposed lower left fingers 52, FIG. 12. The cup stack then swings back to the right, and the lowermost cup is then separated by the lower surfaces of the opposed upper right fingers 54, and falls onto and is supported by the opposed upper surfaces of the lower right fingers 54, FIG. 13. As the cup stack then swings back to the left, the bottom cup is displaced by the lower surfaces of the opposed lower left fingers 52, and is displaced off of the opposed upper surfaces of the lower right fingers to be dispensed and falls into a cup holder in the drink transporter carousel.

In the ice dispenser 14 interface, the ice dispenser is treated as an add-on to the system. The automated drinkmaker system is designed with an opening in the back of the machine to accommodate and allow a chute from an ice dispenser to be inserted into the ice dispensing station of the drinkmaker. A connector on the back of the drinkmaker carries input/output signals to the ice dispenser for controlling the portion of ice, and the timing of dispensing thereof.

A soda dispensing head is mounted above the soda dispensing station 20 of the automated drinkmaker. The drink dispenser can be a quick pour type of drink dispenser such as described in U.S. patent application Ser. No. 107,403 for Soft Drink Dispenser. Controls within the drinkmaker determine when the proper flavor to be dispensed and regulate the portion size. The portion size is calculated by the system controller, knowing the size cup to be filled and the flow rate (for each flavor) from the dispensing head. The calculated value is the time required for a particular flavor syrup and carbonated water to fill a cup. The portion control can also be decoupled from the controller, which allows the drinkmaker system to be operated in a manual mode. Moreover, the position control can also handle special drink orders, such as those requiring no ice, and still fill the cup to the top.

Figure 9:
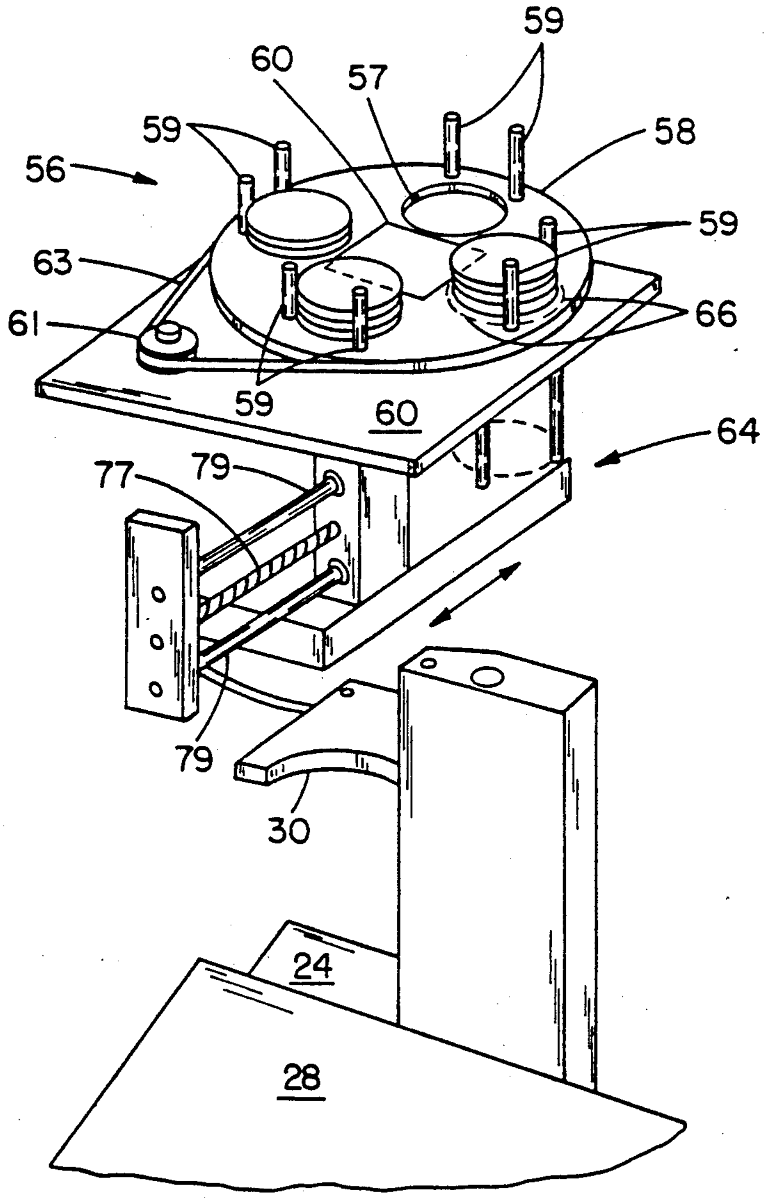
FIG. 9 illustrates schematically the lid carousel and the lid dispenser and applicator forming the subject matter of the present invention.
Figure 15:
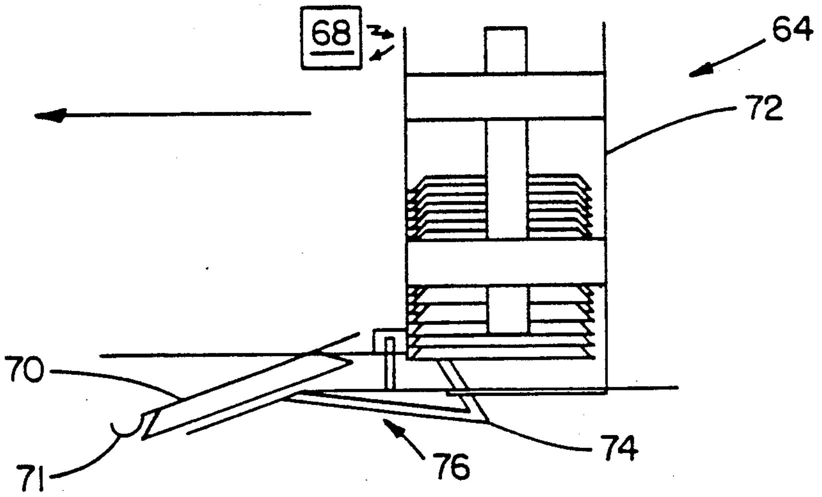
FIGS. 15 and 16 illustrate two successive steps of dispensing a lid from a column of stacked lids and applying it onto a cup.
Figure 16:
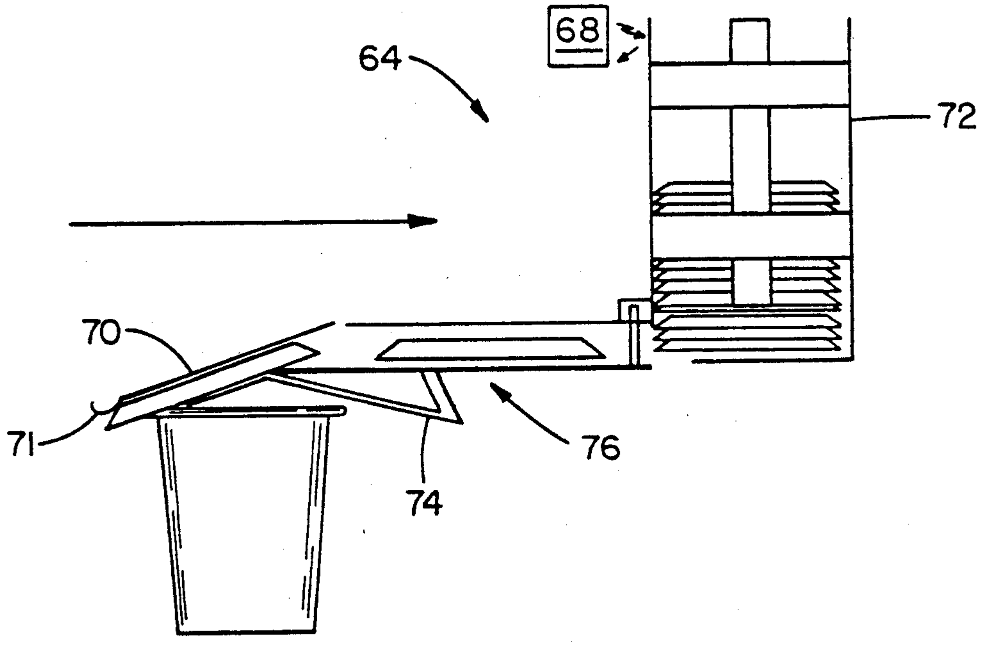

The lidder subassembly is described and claimed in detail in U.S. patent application Ser. No. 07/353,881, filed May 18, 1989, is illustrated in FIGS. 9, 15, 16, and serves three functions, storage of the lids, separation of the bottommost lid from the rest of the stack, and the application of the separated lid onto a cup. The lids are stored in a lid carousel 56 in four stacks, which are designed to take a high volume restaurant through a peak demand period without requiring a refill. The lid carousel comprises a rotatable base plate 58 which has four circular holes 57 therein to define the position of the four lid stacks, each of which is maintained in position by two vertically extending retaining rods 39 and a central retaining housing having a substantially square shape indicated by the base line 60, with the retaining housing extending upwardly therefrom for the height of the lid stacks. The rotatable base plate 58 can be rotated under control of the drinkmaker controller by a stepping motor 61 which drives a belt 63 extending around the rotatable base plate 58. The rotatable base plate 58 of the lid carousel 56 supports the four stacks of lids on a stationary base plate 60 over which the lid stacks slide during rotation of the lid carousel. The lid dispensing mechanism 64 is positioned below a circular hole 66 in the base plate 60, such that a renewal stack of lids can be rotated and slides over the base plate 60 until it reaches the circular hole 66, at which rotation is stopped, to allow the renewal lid stack to fall through the hole 66 into the lid dispensing mechanism 64. When the lid stack in the lid dispenser 64 falls below a preset level, an optical lid stack depletion sensor 68, FIGS. 15, 16, is mounted below the plate 60 adjacent to the stack of lids in the lid dispenser 64 and sends a signal to the controller, and the lid carousel is rotated to deposit more lids into the lid dispenser 64.

The lid carousel subassembly comprises the lid carousel tower 56, the drive motor 61, and sensors. In one designed embodiment, the lid carousel is a 30 inch tower that can accommodate four stacks of lids. When the lid dispenser needs lids, as detected by the lid stack depletion sensor 68, the lid tower is rotated under control of the system controller, to a position in which a stack of lids can drop through the hole 66 in the bottom plate 60 into the lid dispenser 64. The lid carousel is rotated by the controller to each of four positions in which each of four possible stacks of lids is aligned with the hole in the bottom plate in succession to deliver whatever lids are available. If no lids are transferred to the lid dispenser and detected by the lid stack depletion sensor 68 after four attempts, then the operator is notified on display 19 that the lid carousel is empty and needs to be refilled.

The lid dispenser 64 uses a linear motion, as illustrated in FIGS. 15 and 16, to pull a lid from the bottom of a stack and load it into a lid applicator 70, FIG. 15. The lid applicator 70 moves in a straight line over the cup as it applies the lid thereto. At the start of the lid application procedure, the lid catches on the front edge of the cup, FIG. 16. As the applicator is drawn rearwardly, the lid is pulled out of the applicator and is applied by a lid presser 71 onto the cup. The lid presser 71 maintains a steady downward pressure on the lid as it is being drawn out of the applicator, causing the lid to snap onto the cup. The lid applicator 70 is preferably constructed of a high yield strength alloy which is designed to apply a predetermined force downwardly upon the lid regardless of the magnitude of the deflection of the lid applicator. It should be recognized that cups are delivered within a given tolerance range as to their height which will cause more or less deflection of the lid applicator.

The lid dispenser 64 comprises a lid stack support and frame 72 for supporting a stack of lids to be dispensed, a hook 74, a lid shuttle 76, a drive stepping motor, and drive components. The drive components include a screw drive 77 driven by the stepping motor, and two spaced slider bars 79. The lid shuttle 76 is driven linearly along the slider bars 79 by the stepping motor and screw drive 77, and includes a shuttle frame which includes a pair of spaced lateral supports for supporting a lid stack therebetween, and a connecting frame member which mounts the hook with a spring bias upward and also mounts the lid presser and applicator 71. The lid stack support 72 accepts lids from the lid carousel and is designed such that a hook 74 enters through the bottom of the stack and catches on the inside lip of the the bottommost lid. With the hook engaged on the lid, the lid shuttle is moved forwardly and slides the lid out from under the stack. An opening 78 at the front of the tower is designed such that only one lid can pass therethrough at a time. Once a lid has been pulled from the lid stack, the dispenser repeats the cycle. The second time through the cycle, the first lid is pushed into the lid applicator 70 and a second lid slides out from under the stack.

The lid applicator 70 is attached to the lid shuttle 76 of the lid dispenser, and functions to properly position a lid relative to a cup and also to provide the force necessary to apply the lid onto a cup. As the lid dispenser moves rearwardly, the lid applicator 70 is dragged over the top of a cup, applying the lid to the cup as it moves. The applicator is a simple cantilevered plate with a contoured front edge. Significant design parameters of this device are the angle at which it approaches the cup and the spring rate of the catilevered plate.

Summarizing operation of the lid dispenser, assume that lids were just placed in the lid tower 72 and that the lid shuttle is in a retracted position. The controller causes the lid shuttle to move towards its extended position and the lid hook 74 engages the forward edge of the bottommost lid, moving it forward. The lid shuttle moves to its extended position, causing the lid to be positioned at the mid position shown in FIG. 16. The controller next causes the lid shuttle to move towards its retracted position, and the extracted lid is then restrained by gate members in front of the lid tower 72, and slides under the lid applicator 70 to a partially loaded application position, FIG. 15. The controller next causes the lid shuttle to move towards its extended position, while the lid hook 74 engages the forward edge of the next lid which is moved into the mid position shown in FIG. 16 while the first lid is moved into a fully loaded position shown on the left in FIG. 16. The controller next causes the lid shuttle to move towards its retracted position, and the fully loaded lid engages the container therebelow, and is pressed thereon by the constant spring force of the lid applicator 70 as the lid presser 71 presses and snaps it onto the cup during the retraction movement. During that retraction movement, the second lid is restrained by the gate members, and is moved into the partially loaded position of FIG. 15, and the cycle is repeated, etc. Accordingly, each lid is dispensed and applied onto a cup in a procedure requiring two cycled movements of the lid shuttle 76.

The lid applicator also includes an inductive sensor on the lidder drive. A number of driving pulses are issued to the lid shuttle drive motor, and the processor then checks for a signal from the inductive sensor at the proper time. If one is not received, a lid is assumed to be jammed against the cup, and the elevator is dropped a small distance of approximately a quarter inch. A drive signal is then issued again to the stepper motor, and the processor then checks again for the transition signal from the inductive sensor, indicating successful lidding. If the transition signal is not received, the processor assumes a more serious problem, and an error message is displayed on display 19 to the operator, requesting a check of the elevator lidder station, and pressing of a service completed button after the check indicates that the elevator lidder station is clear.

After the inductive sensor indicates a lidder operation is completed, the elevator then raises the lidded cup to a lid marking station, at which one of several lid marking solenoids is actuated to mark the lid. Most drink orders are easily recognized by their color, with the exception of a cola drink and a diet cola drink. These two drinks can also be distinguished, other than by marking, by lidding one and not the other, or by the position on the output conveyor at which the pusher arm deposits the drink.

The output conveyor subsystem is formed by the conveyor 28, the pusher or sweeper arm 26, customer order number displays 29, and sensors 82, 84. This subsystem arranges the drinks by customer order, and informs the store personnel when the output conveyor is full such that no more drink orders can be processed.

Figure 4:
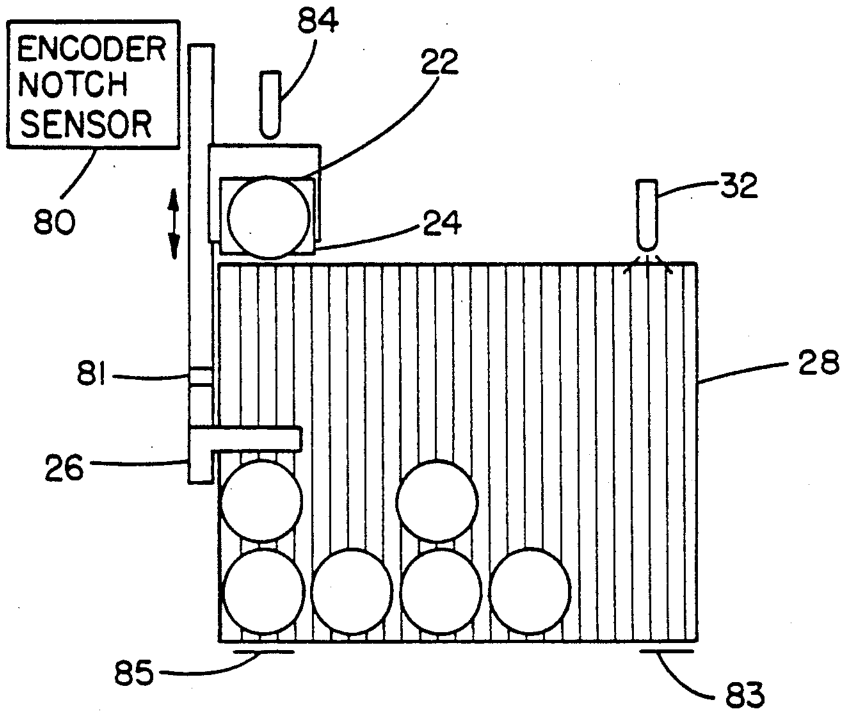
FIG. 4 is a top plan schematic view of the output conveyor and finished drink storage area and a pusher arm for moving a finished drink from an output station of the automated drinkmaker to the front of the output conveyor.

The pusher arm 26 is a linear actuator that takes a completed drink from the output station 22 and positions it onto the output conveyor. The pusher arm has a stroke of 20 inches and can position drinks on the conveyor anywhere along its stroke. Under control of the system controller, the pusher can stack drinks four deep on the output conveyor before the conveyor needs to be indexed to the right by one drink position. As the conveyor is indexed, the customer order numbers on the displays 29 above the conveyor are also indexed to the right. This process continues uninterrupted as long as the store personnel remove drinks from the conveyor at a rate faster than the automated drinkmaker is producing them. If the output conveyor becomes filled with completed drink orders or a drink order remains in the last index position, a beeper is sounded notifying the operating personnel that drinks must be removed. The conveyor detects when it is full by triggering a sensor 82, FIG. 4, located at the far right edge of the conveyor at the last index position, which is a commercially available retroreflective optical sensor which detects radiation reflected by a piece of reflective tape 83 positioned on the opposite side of the output conveyor. A second sensor 84, FIG. 4 is located at the first index position of the output conveyor, opposite to a piece of reflective tape on the opposite side of the conveyor, and is utilized to check whether a cup is in the first index position.

Figure 17:
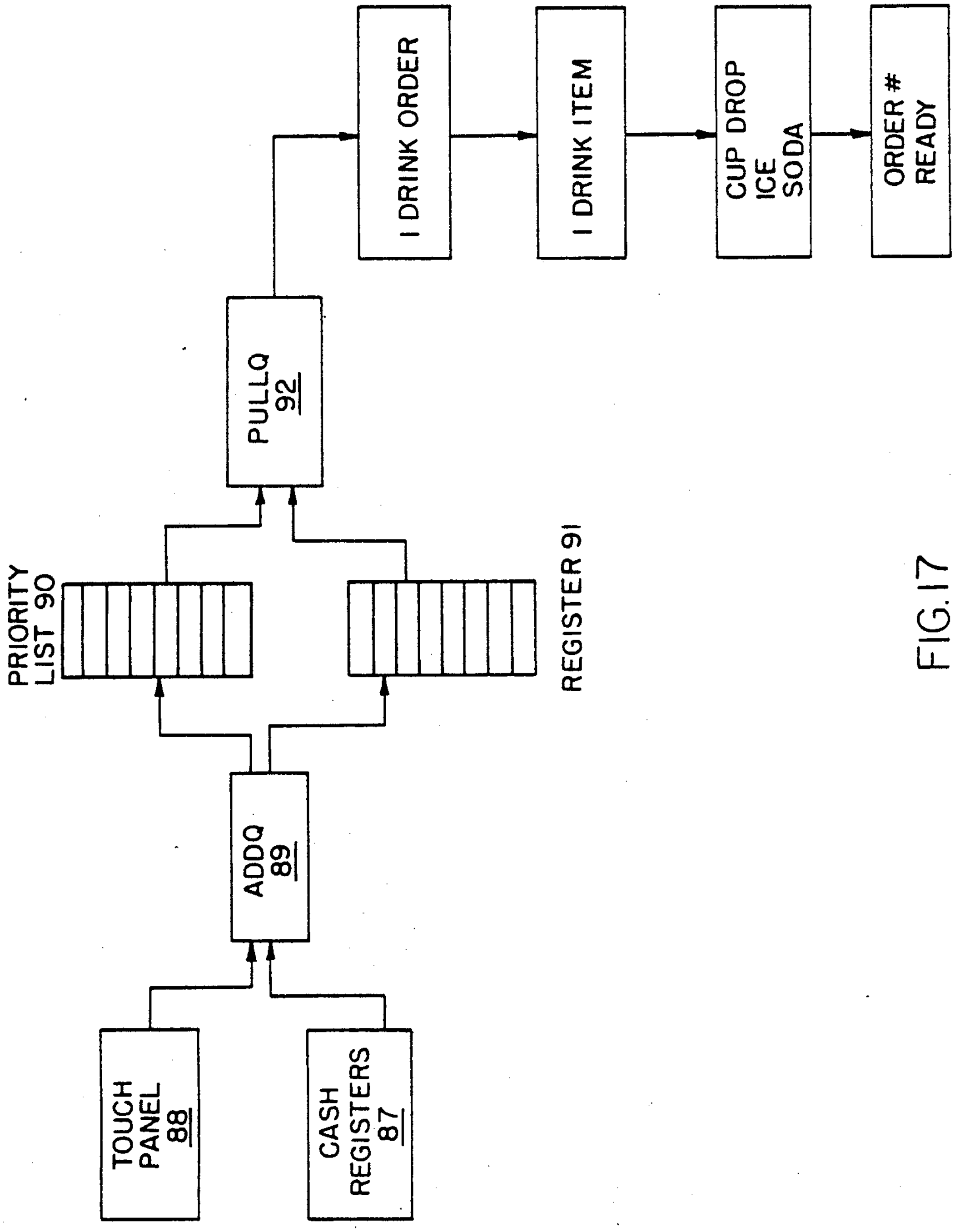
FIG. 17 is a schematic illustration of drink order processing by the processor of the automated drinkmaker.

FIG. 17 illustrates the logic control of drink order processing. Drink orders can be entered through electronic cash registers 87, or through a touch panel 88 located on the control display panel 19, with the latter type drink orders being given a higher priority because of the types of orders they would normally represent. The automated drinkmaker can accept input orders directly from one or more electronic cash registers, an operator actuated panel or switches, a customer actuated panel or switches, or generally from any device which can communicate using an RS232C interface format. Moreover, the touch panel can be utilized in a manual mode in the event the automated drinkmaker system is not functioning. Drink orders proceed through an ADD Q register 89 which receives an assigned number for each order from a register 91 which retains the orders in memory and advances them with the priority list in register 90 as noted above. Depending upon priority, each drink order proceeds through a PULL Q register 92, and the drink order is then broken down into individual drinks which are executed in sequence until the completion of the order, at which time the completed order is on the output conveyor, with the displays 29 indicating the assigned order number.

The following description of the operation of the automated drinkmaker system is a detailed description of the operation, as controlled by the system controller, and summarizes some of the descriptions previously given hereinabove.

When a drink order is received, the retroreflector sensor 82 is activated to check the last index position on the output conveyor to ascertain that no cups are present in the last index position. If not, the output conveyor is indexed (conveyed along its length by) by one drink order position. Then, the output of the second retroreflector sensor 84 mounted at the first index position, is checked to verify that the first index position of the output conveyor is clear of cups.

A diffuse optical sensor 86, FIG. 2, working on a triangulation principle, then checks the cup drop area to determine that it is clear. The cup carousel 34 is then rotated to position the proper cup size at the cup drop area. As described hereinabove, the cup carousel position is determined by an encoder plate which rotates therewith. The position of the cup carousel is initialized when the machine is first turned on, and thereafter the present position is always maintained in memory. As the cup carousel moves, the encoder plate sensor signal is checked to determine that the encoder plate slots pass by the encoder sensor at the proper time. If the cup carousel must be repositioned for a different size cup, the processor determines the direction and extent of rotation (number of pulses) necessary to drive the carousel to position the proper size cup stack at the actuator.

The cup dispenser is then actuated. The actuator slider bar passes by the inductive sensor 45 mounted adjacent to its end, and the cup dispenser pulse stepping motor is pulsed until the inductive sensor 45 detects one complete cycle, indicated by the slider bar being removed from the inductive sensor, or the system times out, indicating a stall. An advantage of this design is to drive the system through minor stalls and cup jams.

The diffuse triangulation type optical sensor 86 in the cup drop station then checks to determine if a cup has dropped. If not, the cup dispenser is actuated again, up to four times, to drop a cup. If a cup does not drop after four attempts, then the processor assumes that the cup stack is empty and places that information in memory, and the cup carousel is rotated to bring another stack of the same size cups into position. The cup dispensing cycle is then repeated, and if no dispensed cup is sensed, and no more cup stacks of the right size are available, as indicated by a check of memory for cup stacks of that size, an error message "CHECK CUPS" is displayed.

When other drinks in the drink transporter are being processed at the same time, all of the operations, cup drop, ice dispense, drink dispense, and cup lidding and drink outputting, are attended to in parallel. A successful flag is returned to the processor from all closed loop work stations after the successful completion of their assigned work orders. The processor checks to determine that the closed loop work stations which have been assigned tasks have returned a successful flag, and then rotates the cup transporter 90°, and the process is repeated. The cup transporter is driven by a stepping motor and is issued a number (e.g. 800) of pulses necessary to accomplish the necessary cup transporter 90° rotation, and the rotation is detected by an encoder disk with different size (either small or large) light transmitting slots therein. The encoder plate sensor signal is checked to determine that the on-off signals are being received at the proper time (the machine is in synchronization). If a transporter sync error is detected, and error message "CHECK TRANSPORTER" is displayed. The operator is to check the transporter, and signals the processor by pressing a button that the transporter is clear with no jammed cups. Once that signal is received, the machine pulses the transporter stepping motor until one of the small or larger slots, positioned 45° apart around the encoder disk, passes by the encoder sensor. The number of pulses required to step the disk through the slot indicates to the machine processor if it is a small or large slot. The system knows the quadrant it was operating in prior to the stall, and thus can ascertain detect its position completely, and can resume operation.

The second work station is the proportioning ice dispenser, and the controller simply issues a signal thereto indicating the proper ice size, small or large, to be dispensed if a drink at the ice dispenser is to receive ice. No ice is dispensed if a signal is not received. The ice issue command is issued in an open loop system, and it is assumed that the ice dispensing order has been executed after a given time.

The third work station is the drink dispenser. The cup volume is known, along with the ice volume, and the flow rate for each type of soda flavor is also known. The controller simply determines the pour time, and actuates the dispensing head for the calculated time in an open loop mode. A liquid level sensing system might also be incorporated in some embodiments, which could affect and simplify operations of the drink dispenser and the ice dispenser.

The fourth work station is the lidder and marker station, at which the elevator lifts a drink from the transporter and positions it at a proper height for lidding. The position of the elevator is first initialized when the machine is turned on, and the position is then maintained and tracked in memory. The elevator is a screw and slide drive, driven by a stepper motor 33, and additionally includes an encoder plate with a notch detected by an encoder sensor when the elevator is at the conveyor position. Accordingly, when pulse commands are given to drive the elevator, the processor also calculates the time when the encoder sensor should detect a transition, and looks for the transition at that time. If the transition is not detected at the calculated time, the machine is out of sync and the operator is notified to check the elevator for problems, and indicates by pushing a switch when the elevator is checked and is free to operate. The machine then resynchronizes itself by looking for the encoder plate notch, and then resumes normal operation.

The position of the elevator is always checked first by the processor prior to issuing a drive command to the drink transporter to determine that the elevator is in a noninterfering down position. The size of cup delivered by the drink transporter to the elevator is known. The lid applicator is a known given distance above the drink transporter, and accordingly the processor determines the vertical drive necessary for the cup size being lidded to raise the cup to the lid applicator to a standard lid applicator position for all cup sizes. The lid applicator is already positioned at its outermost position with a lid in position to be applied to a cup when the elevator raises the cup rim to the standard lid applicator position.

The lid applicator is also a drive screw, stepper motor drive with an inductive sensor on the lidder drive. A number of pulses are issued to the drive motor, and the processor checks for a signal from the inductive sensor at the proper time. If one is not received, a lid is assumed to be jammed against the cup, and the elevator is dropped a small distance of approximately a quarter inch. A drive signal is then issued again to the stepper motor and the processor then checks again for the transition signal from the inductive sensor, indicating successful lidding. If the transition signal is not received, the processor assumes a more serious problem, and an error message is displayed to the operator requesting a check of the elevator lidder station, and pressing of a service completed button after the check indicates the elevator lidder station is clear.

After the inductive sensor indicates a lidder operation is completed, the elevator then raises the lidded cup to a lid marking station, at which one of several lid marking solenoids is actuated to mark the lid. Most drink orders are easily recognized by their color, with the exception of a cola drink and a diet cola drink. These two drinks can also be distinguished, other than by marking, by lidding one and not the other, or by the position on the output conveyor at which the pusher arm deposits the drink.

The rearwardmost position of the sweeper arm is detected and verified by a sensor 81, FIG. 4, positioned by a notch 81 in the sweeper arm in its rearwardmost position. In operation, the sweeper arm is driven rearwardly until the sensor indicates to the controller that the sweeper arm has reached its rearwardmost position, in response to which the controller drops the elevator to the output conveyor. The retroreflector 84 and light reflector indicate to the controller that the first station of the output conveyor is empty, and the controller then actuates the sweeper to position the drink at the proper width location (up to four deep) across the width of the output conveyor.

The order number is displayed with the drink by a two number display by the output conveyor, and is tracked and indexed with the drink order as the drink order is indexed to the right as additional drink orders are completed.

While several embodiments and variations of the present invention for a cup dispenser for an automated drinkmaker system are described in detail herein, it should be apparent that the disclosure and teachings of the present invention will suggest many alternative designs to those skilled in the art.

What is claimed is:

1. A cup dispensing arrangement for separating the bottommost cup from a stack of cups supported in a cup carousel, comprising a cup carousel having a plurality of cup dispensers positioned circumferentially around the cup carousel, such that any one of the cup dispensers can be positioned at a cup drop station, with each cup dispenser supporting a stack of cups to be dispensed, and each cup dispenser being pivotally mounted to the cup carousel by a substantially horizontal pivot, about which the cup dispenser is cyclically pivoted to allow the bottom of the cup stack to cyclically swing through a dispensing travel arc during dispensing of the cups, and each cup dispenser having a pair of opposed cup separating members supported therewith on the cup carousel for rotation therewith, with the pair of opposed cup separating members being mounted on opposite sides of the stack of cups in the cup dispenser along said dispensing travel arc, said opposed cup separating members being spaced a distance apart substantially equal to the width of a cup just beneath the cup rim, and each of said pair opposed cup separating members comprising at least one cup separating wedge positioned opposite to a corresponding cup separating wedge in the oppositely positioned cup separating member, with the oppositely positioned cup separating wedges cooperating to separate a bottommost cup from the cup stack as the cup dispenser is pivoted along the dispensing travel arc.

2. A cup dispensing arrangement for dispensing cups from a stack of cups, as claimed in claim 1, further comprising a cup dispensing mechanism positioned at said cup drop station to activate a cup dispenser positioned thereat by said cup carousel, said cup dispensing mechanism being driven by a pulse stepper motor which is driven by pulses issued by a controller which controls operation of the cup dispensing mechanism.

3. A cup dispensing arrangement for dispensing cups from a stack of cups, as claimed in claim 2, said cup dispenser comprising a slider crank mechanism which is rotated by said pulse stepper motor through a dispensing cycle during one revolution thereof, and including a slider bar positioned to activate a contact arm on each cup dispenser.

4. A cup dispensing arrangement for dispensing cups from a stack of cups, as claimed in claim 3, further including an inductive sensor positioned adjacent to one end of said slider bar too sense the return of the slider bar after said slider crank mechanism is driven through a dispensing cycle.

5. A cup dispensing arrangement for dispensing cups from a stack of cups, as claimed in claim 3, said slider bar including an upwardly extending hook extension for engaging said contact arm which extends downwardly from the cup dispenser.

6. A cup dispensing arrangement for dispensing cups from a stack of cups, as claimed in claim 1, said rotatable cup carousel being driven in rotation by a pulse stepper motor which is driven by pulses issued by a controller which controls operation of the rotatable cup carousel.

7. A cup dispensing arrangement for dispensing cups from a stack of cups, as claimed in claim 1, each cup dispenser being spring biased outwardly on said cup carousel to a neutral stopped position.

8. A cup dispensing arrangement for dispensing cups from a stack of cups, as claimed in claim 1, each of said pair of opposed cup separating members comprising upper and lower cup separating wedges positioned in both forward and rearward positions which are vertically offset relative to each other, with the cup separating members acting in a two cycle manner to separate the bottommost cup from a stack of cups during two complete pivot cycles of the cup dispenser.

* * * * *